United States Patent
Kelso et al.

(10) Patent No.: US 7,934,214 B2
(45) Date of Patent: Apr. 26, 2011

(54) COMPUTER IMPLEMENTED METHOD, SYSTEM AND COMPUTER PROGRAM PRODUCT FOR CONTROLLING SOFTWARE ENTITLEMENT

(75) Inventors: Scott Edwards Kelso, Durham, NC (US); Masahiko Nomura, Sagamihara (JP); David Andrew Sawin, Chapel Hill, NC (US); Randall Scott Springfield, Chapel Hill, NC (US); Rod D. Waltermann, Rougemont, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 1426 days.

(21) Appl. No.: 11/394,792

(22) Filed: Mar. 31, 2006

(65) Prior Publication Data

US 2007/0234348 A1   Oct. 4, 2007

(51) Int. Cl.
G06F 9/445 (2006.01)
H04L 29/06 (2006.01)

(52) U.S. Cl. ........ 717/174; 717/175; 717/176; 717/177; 717/178; 713/155; 713/164; 713/166

(58) Field of Classification Search .................. None
See application file for complete search history.

(56) References Cited

U.S. PATENT DOCUMENTS

| | | | |
|---|---|---|---|
| 5,933,497 A * | 8/1999 | Beetcher et al. | 705/59 |
| 7,676,448 B2 * | 3/2010 | Henderson et al. | 717/171 |
| 7,694,280 B2 * | 4/2010 | James et al. | 717/127 |
| 7,716,662 B2 * | 5/2010 | Seiden | 717/173 |
| 7,788,181 B2 * | 8/2010 | Ben-Menahem et al. | 705/59 |
| 2004/0128395 A1 * | 7/2004 | Miyazaki | 709/229 |
| 2005/0216909 A1 * | 9/2005 | James et al. | 717/174 |
| 2005/0278716 A1 * | 12/2005 | Koppen et al. | 717/168 |
| 2006/0020821 A1 * | 1/2006 | Waltermann et al. | 713/189 |
| 2006/0236318 A1 * | 10/2006 | Moran et al. | 717/168 |
| 2006/0271915 A1 * | 11/2006 | Stefik et al. | 717/127 |
| 2006/0287960 A1 * | 12/2006 | Marsnik et al. | 705/59 |
| 2007/0006161 A1 * | 1/2007 | Kuester et al. | 717/126 |
| 2007/0016531 A1 * | 1/2007 | Boomershine et al. | 705/59 |
| 2009/0282397 A1 * | 11/2009 | Leporini et al. | 717/174 |

* cited by examiner

Primary Examiner — Insun Kang
(74) Attorney, Agent, or Firm — Yee & Associates, P.C.; Carlos Munoz-Bustamante

(57) ABSTRACT

Computer implemented method, system and computer program product for controlling software entitlement. A computer implemented method for controlling software entitlement includes receiving a request to install a software item on a designated machine. A determination is made if the designated machine is of a machine type authorized for installation of the software item. If the designated machine is of a machine type authorized for installation of the software item, a determination is made, using stored configuration data, if at least one additional criterion specified for entitlement to install the software item on the designated machine is satisfied using stored configuration data. If the at least one additional criterion specified for entitlement to install the software item on the designated machine is satisfied, installation of the software item on the designated machine is enabled in accordance with the at least one additional criterion.

20 Claims, 4 Drawing Sheets

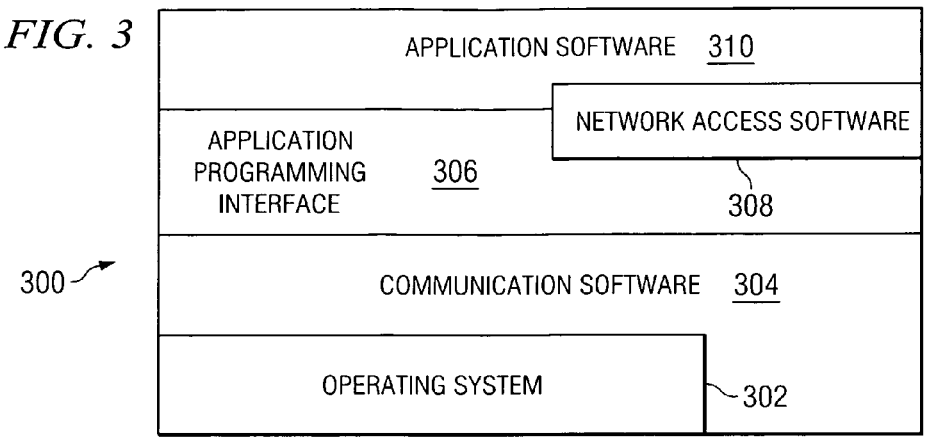
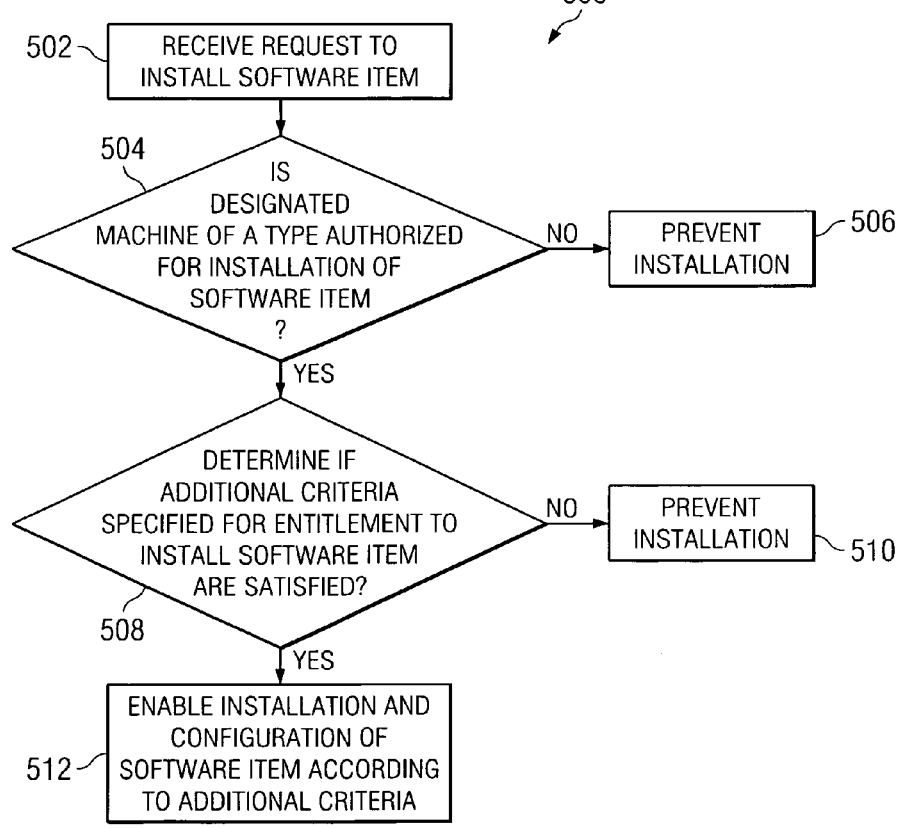

*FIG. 4A*

| SMBIOS FIELD | CONTENTS | HOW SOFTWARE USES THE FIELD |
|---|---|---|
| TYPE 0 (BIOS INFORMATION) OFFSET 0Ah (BIOS CHARACTERISTICS, SYSTEM VENDOR) | BIT48:50 : 3BIT VALUE = ENCLOSURE TYPE | ENCLOSURE TYPE INDICATES WHAT TYPE OF MACHINE, FOR EXAMPLE A DESKTOP PC VERSUS A PORTABLE SYSTEM. SOFTWARE WILL CHECK THE FIELD TO DECIDE WHETHER THE SOFTWARE SHOULD BE INSTALLED AND HOW TO OPERATE ON THE SYSTEM |
| | 00h = INDICATOR THAT SOFTWARE SHOULD NOT INSTALL | |
| | 01h = DESKTOP | |
| | 02h = PORTABLE | |
| | BIT51:556 : 5BIT VALUE = PRODUCT LINE TYPE | PRODUCT LINE TYPE INDICATES THE HARDWARE PRODUCT LINE, FOR EXAMPLE A PREMIUM HARDWARE PRODUCT LINE VERSUS A LOW COST HARDWARE PRODUCT LINE. SOFTWARE WILL CHECK THE FIELD TO DECIDE WHETHER THE SOFTWARE SHOULD BE INSTALLED AND HOW TO OPERATE ON THE SYSTEM |
| | 00h = RESERVED | |
| | 01h = PRODUCT LINE 1 | |
| | 02h = PRODUCT LINE 2 | |
| | 03h - 1Fh = RESERVED FOR ADDITIONAL PRODUCT LINES | |
| TYPE 1 (SYSTEM INFORMATION) OFFSET 04h (MANUFACTURER) | MANUFACTURER NAME | INDICATES THE COMPANY THAT MANUFACTURED THE MACHINE. SOFTWARE WILL CHECK THE FIELD TO DECIDE WHETHER THE SOFTWARE SHOULD BE INSTALLED AND HOW TO OPERATE ON THE SYSTEM |
| TYPE 1 (SYSTEM INFORMATION) OFFSET 05h (PRODUCT NAME) | PRODUCT MODEL NUMBER | INDICATES THE MODEL NUMBER OF THE MACHINE. SOFTWARE CAN CHECK THE FIELD TO DECIDE WHETHER THE SOFTWARE SHOULD BE INSTALLED AND HOW TO OPERATE ON THE SYSTEM |

| | | FROM FIG. 4A |
|---|---|---|
| TYPE 1 (SYSTEM INFORMATION) OFFSET 06h (VERSION) | PRODUCT MARKETING NAME | INDICATES THE PRODUCT MARKETING NAME OF THE MACHINE. SOFTWARE CAN CHECK THE FIELD TO DECIDE WHETHER THE SOFTWARE SHOULD BE INSTALLED AND HOW TO OPERATE ON THE SYSTEM |
| TYPE 1 (SYSTEM INFORMATION) OFFSET 07h (SERIAL NUMBER) | SYSTEM SERIAL NUMBER | INDICATES THE SYSTEM SERIAL NUMBER NAME OF THE MACHINE. SOFTWARE CAN CHECK THE FIELD TO DECIDE WHETHER THE SOFTWARE SHOULD BE INSTALLED AND HOW TO OPERATE ON THE SYSTEM |
| TYPE 1 (SYSTEM INFORMATION) OFFSET 08h (UUID) | SYSTEM UNIQUE UNIVERSAL IDENTIFIER | INDICATES THE SYSTEM UUID OF THE MACHINE. SOFTWARE CAN CHECK THE FIELD TO DECIDE WHETHER THE SOFTWARE SHOULD BE INSTALLED AND HOW TO OPERATE ON THE SYSTEM |
| TYPE 2 (PRODUCT INFORMATION) OFFSET 05h (PRODUCT) | ANY STRING VARIABLE SUCH AS A WORD OR SEQUENCE OF NUMBERS AND LETTERS | INDICATES ONE OR MORE OF THE POSSIBLE ADDITIONAL ENTITLEMENT CRITERIA. IT CAN ALSO BE DEFINED FOR NEW CRITERIA |
| TYPE 83h (OEM DEFINED INFORMATION) | DATA: 16 BYTES, 128 BITS. USED FOR A SINGLE OR A RELATED SET OF BINARY VARIABLES | INDICATES ONE OR MORE OF THE POSSIBLE ADDITIONAL ENTITLEMENT CRITERIA DESCRIBED IN THE DISCLOSURE. IT CAN ALSO BE DEFINED FOR NEW CRITERIA |

COMPUTER IMPLEMENTED METHOD, SYSTEM AND COMPUTER PROGRAM PRODUCT FOR CONTROLLING SOFTWARE ENTITLEMENT

BACKGROUND OF THE INVENTION

1. Field of the Invention

The present invention relates generally to the data processing field and, more particularly, to a computer implemented method, system and computer program product for controlling software entitlement.

2. Description of the Related Art

The Software and Information Industry Association (SIIA) has estimated that thirty percent of software in use today is pirated and results in losses of 11-12 billion dollars annually to software manufacturers.

Many schemes have been developed and put into place in an effort to prevent software piracy. For example, BIOS (Basic Input/Output System) locking has recently become a popular tool for ensuring that software can be installed only on an intended and licensed hardware platform. BIOS locking schemes have many advantages over other known mechanisms for preventing software piracy, such as license keys and activation mechanisms, because they are generally easier to use and more difficult to crack. As a result, BIOS locking has become a preferred method for protecting software against piracy.

BIOS locking schemes are basically go/no go schemes in which a machine is either allowed to install or prevented from installing a particular software title, based on factors such as the manufacturer of the machine, the particular model of the machine, or the like. BIOS locking schemes, thus, do not provide very much flexibility in controlling software entitlement. A mechanism that provides more flexible control over whether or not a particular machine is entitled to receive a particular software item can be a valuable asset to software and/or hardware providers to enhance product marketing, to ensure compliance with laws and regulations of different jurisdictions, and for many other reasons.

There is, accordingly, a need for a mechanism that provides increased flexibility in controlling software entitlement.

BRIEF SUMMARY OF THE INVENTION

The illustrative embodiments provide a computer implemented method, system and computer program product for controlling software entitlement. A computer implemented method for controlling software entitlement includes receiving a request to install a software item on a designated machine. A determination is made if the designated machine is of a machine type authorized for installation of the software item. If the designated machine is of a machine type authorized for installation of the software item, a determination is made, using stored configuration data, if at least one additional criterion specified for entitlement to install the software item on the designated machine is satisfied. If the at least one additional criterion specified for entitlement to install the software item on the designated machine is satisfied, installation of the software item on the designated machine is enabled in accordance with the at least one additional criterion.

BRIEF DESCRIPTION OF THE SEVERAL VIEWS OF THE DRAWINGS

The novel features believed characteristic of the illustrative embodiments are set forth in the appended claims. The illustrative embodiments itself, however, as well as a preferred mode of use, further objectives and advantages thereof, will best be understood by reference to the following detailed description of the illustrative embodiments when read in conjunction with the accompanying drawings, wherein:

FIG. 3 depicts a typical software architecture for a server-client system in accordance with the illustrative embodiments;

FIGS. 4A and 4B together illustrate a Desktop Management Interface (DMI) structure definition in accordance with a specific implementation; and FIG. 5 is a flowchart that illustrates a method for controlling software enablement according to the illustrative embodiments.

DETAILED DESCRIPTION OF THE INVENTION

Figure 1:
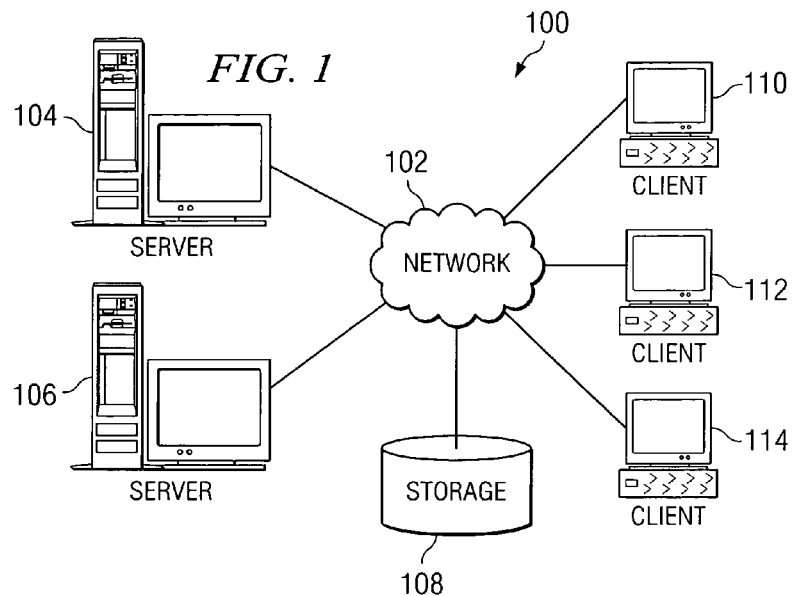
FIG. 1 depicts a pictorial representation of a network of data processing systems in which aspects of the illustrative embodiments may be implemented.
Figure 2:
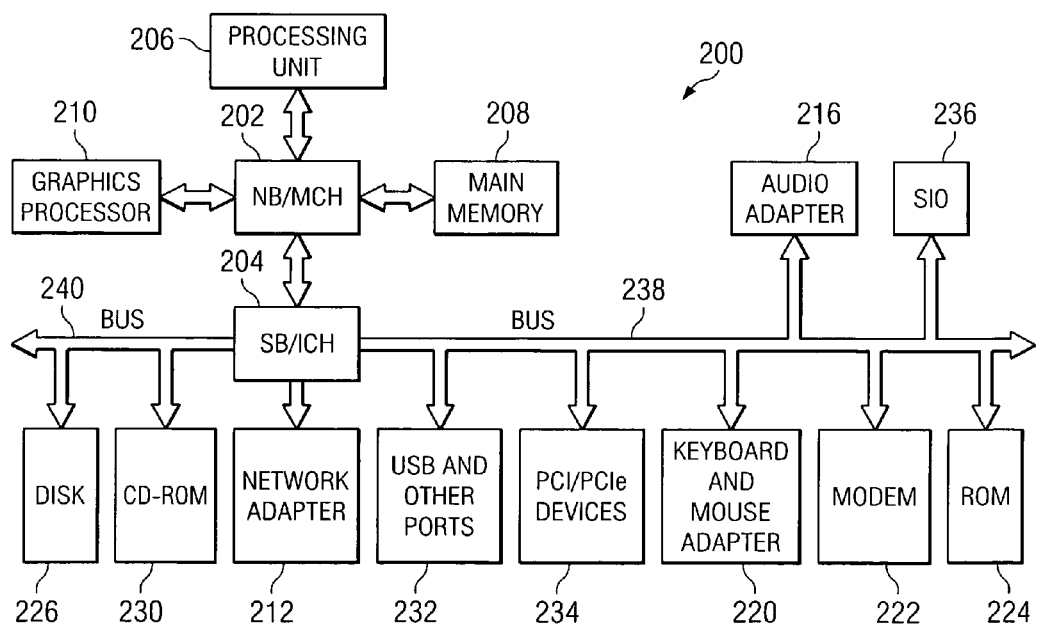
FIG. 2 is a block diagram of a data processing system in which aspects of the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which aspects of the illustrative embodiments may be implemented. Many modifications to the depicted environments may be made without departing from the spirit and scope of the illustrative embodiments.

With reference now to the figures, FIG. 1 depicts a pictorial representation of a network of data processing systems in which aspects of the illustrative embodiments may be implemented. Network data processing system 100 is a network of computers in which illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different illustrative embodiments.

With reference now to FIG. 2, a block diagram of a data processing system is shown in which aspects of the invention may be implemented. Data processing system 200 is an example of a computer, such as server 104 or client 110 in FIG. 1, in which computer usable code or instructions implementing the processes for illustrative embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the illustrative embodiments provide for a computer implemented method, apparatus, and computer usable program code for compiling source code. The methods of the illustrative embodiments may be performed in a data processing system, such as data processing system 100 shown in FIG. 1 or data processing system 200 shown in FIG. 2.

Turning to FIG. 3, typical software architecture for a server-client system is depicted in accordance with an exemplary embodiment of the illustrative embodiments. At the lowest level, operating system 302 is utilized to provide high-level functionality to the user and to other software. Such an operating system typically includes a Basic Input/Output System (BIOS), although other mechanisms such as Extensible Firmware Interface (EFI) systems may also be used. Communication software 304 provides communications through an external port to a network such as the Internet via a physical communications link by either directly invoking operating system functionality or indirectly bypassing the operating system to access the hardware for communications over the network.

Application programming interface (API) allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers. Application software 310 represents any number of software applications designed to react to data through the communications port to provide the desired functionality the user seeks. Applications at this level may include those necessary to handle data, video, graphics, photos or text, which can be accessed by users of the Internet. The mechanism of the illustrative embodiments may be implemented within communications software 304 in these examples.

The illustrative embodiments provide a computer implemented method, system and computer program product for controlling software entitlement. More particularly, the illustrative embodiments provide a software entitlement scheme that provides a capability of controlling whether a particular software item is entitled to be installed on a particular machine based on one or more flexibly defined criteria. As will be described more fully hereinafter, such criteria may include criteria related to the tier level of the machine, criteria related to software and/or hardware currently installed on the machine, criteria related to the physical location of the machine, and on many other factors.

In general, the illustrative embodiments provide the ability to control software entitlement on essentially a machine-by-machine basis rather than in a "go/no go" manner based solely on machine type or the like. As a result, a software provider can design an appropriate software entitlement program that will assist the provider in marketing hardware and/or software products and for other purposes.

A software entitlement mechanism according to an illustrative embodiment addresses the following requirements:

1. Ensures that a software item can only be installed on a particular machine (e.g., a PC or other computer system) that is authorized to install the software item;
2. Enables a software item to be configured dynamically for the type of machine it is installed on; and
3. Allows or prevents a software item or specific features of a software item from being used on a particular machine based on flexibly defined criteria specified, for example, by system and software vendors.

A software entitlement scheme according to the illustrative embodiments utilize BIOS (Basic Input/Output System) in conjunction with DMI (Desktop Management Interface) as a key for controlling entitlement to install software on a particular machine based on flexibly defined criteria. DMI is an application program interface that enables software to collect information about a computer environment. For example, using DMI a software program can determine what software and expansion boards are installed on a computer. DMI was designed by the Desktop Management Task Force (DMTF), a consortium of hardware manufacturers, and allows a central computer to not only gather information about individual machines connected to a network, but also to configure the machines. The illustrative embodiments, in effect, utilize DMI as a mechanism for pre-storing data in system firmware that can be checked by software installation code associated with a software item to ensure that a particular machine satisfies criteria specified for entitlement to install the software item.

According to the illustrative embodiments, when a request is received to install a software item on a particular machine, for example, by downloading the software from a floppy disk or other storage medium, or via the Internet from a provider of the software, a determination is first made if the designated machine is of a machine type that is authorized to receive the software item. For example, it is determined if the designated machine was manufactured by a particular manufacturer or is of a particular machine model. Such determination can be made, for example, utilizing known BIOS locking schemes.

Once it is determined, however, that a designated machine is authorized to install a particular software item, it is determined, using installation data stored in machine firmware, if at least one additional criterion specified for entitlement to install the software item on the designated machine is satisfied. Examples of additional criteria that can be specified include the following:

Market tier criteria—A vendor may wish a particular software item to be made available to a machine based on market tier. For example, as will be described more fully hereinafter, a vendor may wish a software item to be made available free of charge for "high end" machines, i.e., more costly machines having enhanced capabilities, while preventing or limiting the availability of the software item to lower tier machines.

Machine software and hardware criteria—Entitlement to a software item can be restricted based on the nature of hardware and/or software currently in the designated machine. For example, entitlement can be based on whether a designated machine has BIOS support, whether it includes adequate anti-virus protection and the like.

Software version criteria—Entitlement can be based on whether a machine currently contains a current version of the software item. For example, a provider may wish to provide Version 4 of a software item to a designated machine that currently uses Version 3 of the software item at no charge, but to require payment if the designated machine is currently running an older version of the software item.

Geographical Criteria—Entitlement to receive a software item can be controlled based on the country or other geographical area in which the designated machine or the user/owner of the machine is located. This criterion can be used, for example, to ensure compliance with export restrictions or to prevent entitlement in countries where another entity has been authorized to provide the software item.

It should be clearly understood that the above entitlement criteria is intended to be exemplary only. Software entitlement according to the illustrative embodiments can be based on numerous criteria depending on the needs or desires of a software provider or on other factors.

Once it is determined that a designated machine satisfies the additional criteria specified for entitlement to install a software item, installation and configuration of the software item is enabled.

According to one illustrative embodiment, market tier criteria are used to determine entitlement to install a software item. For example, products manufactured by a company can be divided into tiers including a high-end tier, a low-end tier and a mid-level tier. Machines in the high-end tier can be entitled to install and fully operate a software item, while machines in the low-end tier can be prevented from installing and operating the software item. Machines in the mid-level tier, however, can be entitled to install and operate a limited version of the software item based on the one or more of the additional criteria. The additional criteria can be selected based on numerous factors, and may differ for different machines. For example, the additional criteria might entitle certain operations and prevent other operations on different machines. Also, the additional criteria might specify that operation of the software item on one machine be in a manner that might differ from a manner of operation of the software item on a different machine (as a simple example, one manner of operation might generate a blue background while another manner of operation might generate a green background). In general, a software provider is given significantly increased flexibility in controlling software entitlement on essentially a machine-by-machine basis.

According to the illustrative embodiments, a BIOS DMI data scheme is used to determine software entitlement. In particular, according to the illustrative embodiments, at least one additional criterion specified for entitlement to install a software item on a designated machine is specified by adding additional data to DMI. Installation software associated with the software item then utilizes the BIOS DMI data to determine the manner in which the software item should be installed on a particular machine. For example, the data may specify that a software item be installed and fully operated on a designated machine, not installed or operated on a designated machine, or installed and operated in a specified, limited manner on a designated machine.

FIGS. 4A and 4B together illustrate a DMI structure definition in accordance with a specific implementation of the illustrative embodiments. The structure is generally designated by reference number 400, and illustrates various SMBIOS fields 402, the contents 404 of the fields and a description 406 of how the software uses the fields. As shown, different bits are used to specify the various criteria that must be satisfied before a designated machine is granted entitlement to install the software, and, according to the illustrative embodiments, a 128-bit area is defined to specify the various criteria.

As shown in FIGS. 4A and 4B, the Type 0 SMBIOS field (BIOS information) is used to specify the type of machine (e.g., desktop or portable machine) and the Type 1 field (System information) is used to designate the manufacturer, model number and product marketing name of a machine. The Type 2 field (Product information) and Type 83h field (OEM defined information) are used to indicate one or more additional entitlement criteria such as described above.

FIG. 5 is a flowchart that illustrates a method for controlling software entitlement according to the illustrative embodiments. The method is generally designated by reference number 500, and begins when a request is received to install a software item on a designated machine (Step 502). A determination is made if the designated machine is of a machine type that is authorized for installation of the software item (Step 504). If it is determined that the requesting machine is of a machine type that is not authorized for installation of the software item (No output of Step 504), installation of the software item is prevented (Step 506), and the method ends.

If it is determined that the requesting machine is of a machine type that is authorized for installation of the software item (Yes output of Step 504), it is determined, using stored configuration data, if at least one additional criterion specified for entitlement to install the software item on the designated machine is satisfied (Step 508). As described previously, the additional criteria may include any one or more of market tier criteria, software and/or hardware criteria with respect to the designated machine, criteria related to the version of the software item, geographical criteria and the like.

If it is determined that the designated machine does not satisfy the at least one additional criterion specified for entitlement to install the software item (No output of Step 508), installation of the software item is prevented (Step 510), and the method ends. If it is determined that the at least one additional criterion specified for entitlement to install the software item on the designated machine is satisfied (Yes output of Step 508), installation and configuration of the software item on the designated machine is enabled in accordance with the at least one additional criteria (Step 512), and the method ends. As indicated previously, the installation may be complete or limited depending on the criteria, and may result in the software item being configured differently for different machines.

The illustrative embodiments thus provide a computer implemented method, system and computer program product for controlling software entitlement. A computer implemented method for controlling software entitlement includes receiving a request to install a software item on a designated machine. A determination is made if the designated machine is of a machine type authorized for installation of the software item. If the designated machine is of a machine type authorized for installation of the software item, a determination is made, using stored configuration data, if at least one additional criterion specified for entitlement to install the software item on the designated machine is satisfied. If the at least one additional criterion specified for entitlement to install the software item on the designated machine is satisfied, installation of the software item on the designated machine is enabled in accordance with the at least one additional criterion.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for controlling software entitlement, the computer implemented method comprising:
   receiving a request to install a software item on a designated machine;
   responsive to receiving the request, determining if the designated machine is of a machine type authorized for installation of the software item;
   responsive to determining that the designated machine is of a machine type authorized for installation of the software item, determining, using stored configuration data, if at least one additional criterion specified for entitlement to install the software item on the designated machine is satisfied; and
   responsive to determining that at least one additional criterion specified for entitlement to install the software item on the designated machine is satisfied, enabling installation of the software item on the designated machine in accordance with the at least one additional criterion.

2. The computer implemented method according to claim 1, wherein enabling installation of the software item on the designated machine in accordance with the at least one additional criterion, comprises:

enabling limited installation and operation of the software item in accordance with the at least one additional criterion.

3. The computer implemented method according to claim 1, wherein enabling installation of the software item on the designated machine in accordance with the at least one additional criterion, comprises:

enabling installation and operation of the software item on the designated machine in accordance with at least one additional criterion specifying a manner of operation that differs from a manner of operation of the software item on a different designated machine.

4. The computer implemented method according to claim 1, wherein the at least one additional criterion specified for entitlement to install the software item on the designated machine comprises at least one of criteria related to market tier level of the designated machine, criteria related to software or hardware currently in the designated machine, criteria related to a version of the software item, and criteria related to a geographical location of the designated machine or a user of the designated machine.

5. The computer implemented method according to claim 1, wherein determining, using stored configuration data, if at least one additional criterion specified for entitlement to install the software item on the designated machine is satisfied, comprises:

determining if the designated machine is in a particular market tier level among a plurality of market tier levels.

6. The computer implemented method according to claim 5, wherein enabling installation of the software item on the designated machine in accordance with the at least one additional criterion, comprises:

enabling partial installation of the software item on the designated machine in accordance with the at least one additional criterion responsive to determining that the designated machine is in the particular tier level.

7. The computer implemented method according to claim 6, wherein the particular tier level is an intermediate tier level among the plurality of tier levels.

8. The computer implemented method according to claim 7, and further comprising:

enabling full installation and operation of the software item on a designated machine responsive to determining that the designated machine in a high market tier level, and preventing installation and operation of the software item on a designated machine responsive to determining that the designated machine is in a low market tier level.

9. The computer implemented method according to claim 1, wherein the stored data is stored using a Desktop Management Interface that is checked by software installation code associated with the designated software item.

10. The computer implemented method according to claim 1, wherein the at least one additional criterion is specified by at least a provider of the software item.

11. A computer program product, comprising:

a computer readable storage medium having computer usable program code configured for controlling software entitlement, the computer program product comprising:

computer usable program code configured for receiving a request to install a software item on a designated machine;

computer usable program code, responsive to receiving the request, configured for determining if the designated machine is of a machine type authorized for installation of the software item;

responsive to determining that the designated machine is of a machine type authorized for installation of the software item, computer usable program code configured for determining, using stored configuration data, if at least one additional criterion specified for entitlement to install the software item on the designated machine is satisfied; and responsive to determining that at least one additional criterion specified for entitlement to install the software item on the designated machine is satisfied, computer usable program code configured for enabling installation of the software item on the designated machine in accordance with the at least one additional criterion.

12. The computer program product according to claim 11, wherein the computer usable program code configured for enabling installation of the software item on the designated machine in accordance with the at least one additional criterion, comprises:

computer usable program code configured for enabling limited installation and operation of the software item in accordance with the at least one additional criterion.

13. The computer program product according to claim 11, wherein the computer usable program code configured for enabling installation of the software item on the designated machine in accordance with the at least one additional criterion, comprises:

computer usable program code configured for enabling installation and operation of the software item on the designated machine in accordance with at least one additional criterion specifying a manner of operation that differs from a manner of operation of the software item on a different designated machine.

14. The computer program product according to claim 11, wherein the at least one additional criterion specified for entitlement to install the software item on the designated machine comprises at least one of criteria related to market tier level of the designated machine, criteria related to software or hardware currently in the designated machine, criteria related to a version of the software item, and criteria related to a geographical location of the designated machine or a user of the designated machine.

15. The computer program product according to claim 11, wherein the computer usable program code configured for determining, using stored configuration data, if at least one additional criterion specified for entitlement to install the software item on the designated machine is satisfied, comprises:

computer usable program code configured for determining if the designated machine is in a particular market tier level among a plurality of market tier levels.

16. The computer program product according to claim 15, wherein the computer usable program code configured for enabling installation of the software item on the designated machine in accordance with the at least one additional criterion, comprises:

computer usable program code configured for enabling partial installation of the software item on the designated machine in accordance with the at least one additional criterion responsive to determining that the designated machine is in the particular tier level.

17. The computer program product according to claim 16, and further comprising:
- computer usable program code configured for enabling full installation and operation of the software item on a designated machine responsive to determining that the designated machine in a high market tier level, and
- computer usable program code configured for preventing installation and operation of the software item on a designated machine responsive to determining that the designated machine is in a low market tier level.

18. The computer program product according to claim 11, wherein the stored data is stored using a Desktop Management Interface that is checked by software installation code associated with the designated software item.

19. An apparatus, comprising:
- a bus;
- a memory connected to the bus, wherein the memory includes program code; and
- at least one processor unit connected to the bus, wherein the at least one processor unit is configured to execute the program code to:
- receive a request to install a software item on a designated machine;
- responsive to receiving the request, determine if the designated machine is of a machine type authorized for installation of the software item;
- responsive to determining that the designated machine is of a machine type authorized for installation of the software item, determine using stored configuration data, if at least one additional criterion specified for entitlement to install the software item on the designated machine is satisfied using stored installation data; and
- responsive to determining that at least one additional criterion specified for entitlement to install the software item on the designated machine is satisfied, enable installation of the software item on the designated machine in accordance with the at least one additional criterion.

20. The apparatus according to claim 19, wherein the stored data is stored using a Desktop Management Interface that is checked by software installation code associated with the designated software item.

* * * * *